United States Patent
Larson et al.

(10) Patent No.: US 10,679,150 B1
(45) Date of Patent: Jun. 9, 2020

(54) SYSTEMS AND METHODS FOR AUTOMATICALLY CONFIGURING TRAINING DATA FOR TRAINING MACHINE LEARNING MODELS OF A MACHINE LEARNING-BASED DIALOGUE SYSTEM INCLUDING SEEDING TRAINING SAMPLES OR CURATING A CORPUS OF TRAINING DATA BASED ON INSTANCES OF TRAINING DATA IDENTIFIED AS ANOMALOUS

(71) Applicant: Clinc, Inc., Ann Arbor, MI (US)

(72) Inventors: Stefan Larson, Ann Arbor, MI (US); Anish Mahendran, Ann Arbor, MI (US); Andrew Lee, Ann Arbor, MI (US); Jonathan K. Kummerfeld, Ann Arbor, MI (US); Parker Hill, Ann Arbor, MI (US); Michael A. Laurenzano, Ann Arbor, MI (US); Johann Hauswald, Ann Arbor, MI (US); Lingjia Tang, Ann Arbor, MI (US); Jason Mars, Ann Arbor, MI (US)

(73) Assignee: Clinc, Inc., Ann Arbor, MI (US)

( * ) Notice: Subject to any disclaimer, the term of this patent is extended or adjusted under 35 U.S.C. 154(b) by 0 days.

(21) Appl. No.: 16/689,287

(22) Filed: Nov. 20, 2019

Related U.S. Application Data

(60) Provisional application No. 62/779,236, filed on Dec. 13, 2018, provisional application No. 62/829,289, filed on Apr. 4, 2019.

(51) Int. Cl.
*G06N 20/10* (2019.01)
*G06K 9/62* (2006.01)
(Continued)

(52) U.S. Cl.
CPC ............. *G06N 20/10* (2019.01); *G06F 17/18* (2013.01); *G06F 40/279* (2020.01);
(Continued)

(58) Field of Classification Search
None
See application file for complete search history.

(56) References Cited

U.S. PATENT DOCUMENTS 4,516,201 A 5/1985 Warren et al.
5,371,807 A 12/1994 Register et al.
(Continued)

FOREIGN PATENT DOCUMENTS

WO 2015192239 A1 12/2015
WO 2017184587 A1 10/2017

OTHER PUBLICATIONS

Hautamäki, V. et al. (2005). "Improving K-Means by Outlier Removal". SCIA 2005, LNCS 3540, pp. 978-987, 2005. (Year: 2005).*

(Continued)

*Primary Examiner* — Kamran Afshar
*Assistant Examiner* — Benjamin J Buss
(74) *Attorney, Agent, or Firm* — Padowithz Alce

(57) ABSTRACT

A system and method for improving a machine learning-based dialogue system includes: sourcing a corpus of raw machine learning training data from sources of training data based on a plurality of seed training samples, wherein the corpus of raw machine learning training data comprises a plurality of distinct instances of training data; generating a vector representation for each distinct instance of training data; identifying statistical characteristics of the corpus of raw machine learning training data based on a mapping of the vector representation for each distinct instance of training data; identifying anomalous instances of the plurality of (Continued)

distinct instances of training data of the corpus of raw machine learning training data based on the identified statistical characteristics of the corpus; and curating the corpus of raw machine learning training data based on each of the instances of training data identified as anomalous instances.

19 Claims, 6 Drawing Sheets

(51) Int. Cl.
  *G06F 17/18* (2006.01)
  *G06F 40/279* (2020.01)
(52) U.S. Cl.
  CPC ......... *G06K 9/6256* (2013.01); *G06K 9/6262* (2013.01); *G06K 9/6272* (2013.01)

(56) References Cited

U.S. PATENT DOCUMENTS

| | | | |
|---|---|---|---|
| 5,727,950 | A | 3/1998 | Cook et al. |
| 6,374,226 | B1 | 4/2002 | Hunt et al. |
| 6,455,991 | B2 | 9/2002 | Tsuji |
| 6,456,991 | B1 | 9/2002 | Srinivasa et al. |
| 7,480,640 | B1* | 1/2009 | Elad ........................ G06Q 10/10 706/14 |
| 7,769,705 | B1 | 8/2010 | Luechtefeld |
| 7,792,353 | B2 | 9/2010 | Forman et al. |
| 8,069,131 | B1 | 11/2011 | Luechtefeld et al. |
| 8,090,085 | B2 | 1/2012 | Di et al. |
| 8,140,450 | B2 | 3/2012 | Porikli et al. |
| 8,738,365 | B2 | 5/2014 | Ferrucci et al. |
| 8,825,533 | B2 | 9/2014 | Basson et al. |
| 8,898,098 | B1 | 11/2014 | Luechtefeld |
| 8,934,619 | B2 | 1/2015 | Di Fabbrizio et al. |
| 9,112,976 | B2 | 8/2015 | Phelps et al. |
| 9,189,742 | B2 | 11/2015 | London |
| 9,489,625 | B2 | 11/2016 | Kalns et al. |
| 9,552,549 | B1 | 1/2017 | Gong et al. |
| 9,862,245 | B2 | 1/2018 | Kim |
| 9,886,953 | B2 | 2/2018 | Lemay et al. |
| 10,062,039 | B1* | 8/2018 | Lockett .................. G06N 20/00 |
| 10,235,624 | B2* | 3/2019 | Liu .......................... G06N 3/04 |
| 2002/0083068 | A1 | 6/2002 | Quass et al. |
| 2004/0128624 | A1 | 7/2004 | Arellano et al. |
| 2005/0131660 | A1* | 6/2005 | Yadegar .................. G06T 9/001 703/2 |
| 2006/0166174 | A1 | 7/2006 | Rowe et al. |
| 2007/0038609 | A1 | 2/2007 | Wu |
| 2007/0185896 | A1 | 8/2007 | Jagannath et al. |
| 2009/0030800 | A1 | 1/2009 | Grois |
| 2009/0204386 | A1 | 8/2009 | Seligman et al. |
| 2010/0121808 | A1 | 5/2010 | Kuhn |
| 2011/0125734 | A1 | 5/2011 | Duboue et al. |
| 2011/0231182 | A1 | 9/2011 | Weider et al. |
| 2012/0254333 | A1* | 10/2012 | Chandramouli ........ G06F 40/40 709/206 |
| 2013/0031476 | A1 | 1/2013 | Coin et al. |
| 2013/0071837 | A1* | 3/2013 | Winters-Hilt ........ C12Q 1/6869 435/6.11 |
| 2013/0185074 | A1 | 7/2013 | Gruber et al. |
| 2013/0288222 | A1 | 10/2013 | Stacy et al. |
| 2014/0108308 | A1 | 4/2014 | Stout et al. |
| 2014/0337266 | A1 | 11/2014 | Kalns et al. |
| 2014/0379323 | A1* | 12/2014 | Anastasakos ....... G06F 16/3329 704/9 |
| 2015/0286955 | A1 | 10/2015 | Virkar et al. |
| 2015/0310858 | A1 | 10/2015 | Li et al. |
| 2015/0339590 | A1 | 11/2015 | Maarek et al. |
| 2015/0382047 | A1 | 12/2015 | Van Os et al. |
| 2016/0019469 | A1 | 1/2016 | Petrov |
| 2016/0026634 | A1 | 1/2016 | Allen et al. |
| 2016/0048772 | A1 | 2/2016 | Bruno et al. |
| 2016/0063389 | A1 | 3/2016 | Fuchs et al. |
| 2016/0070992 | A1 | 3/2016 | Fujii |
| 2016/0225372 | A1* | 8/2016 | Cheung ................... G06F 3/167 |
| 2016/0260436 | A1 | 9/2016 | Lemay et al. |
| 2017/0124487 | A1 | 5/2017 | Szeto et al. |
| 2017/0160813 | A1 | 6/2017 | Divakaran et al. |
| 2017/0206152 | A1 | 7/2017 | Kochura et al. |
| 2017/0300831 | A1 | 10/2017 | Gelfenbeyn et al. |
| 2017/0337478 | A1* | 11/2017 | Sarikaya ................. G06F 3/167 |
| 2018/0047388 | A1 | 2/2018 | Tyagi et al. |
| 2018/0165554 | A1* | 6/2018 | Zhang .................. G06K 9/6269 |
| 2018/0365212 | A1 | 12/2018 | Banerjee et al. |
| 2019/0042988 | A1* | 2/2019 | Brown ............... G06F 16/9535 |
| 2019/0171943 | A1* | 6/2019 | Pao ...................... G06F 16/338 |
| 2019/0188317 | A1* | 6/2019 | Kashyap ............... G06N 5/022 |
| 2019/0235831 | A1 | 8/2019 | Bao |
| 2019/0237061 | A1* | 8/2019 | Rusak .................. G06F 40/247 |
| 2019/0371456 | A1* | 12/2019 | Page ..................... G16H 10/60 |

OTHER PUBLICATIONS

Poonsirivong, K. et al. (Jul. 2017). "A Rapid Anomaly Detection Technique for Big Data Curation". 2017 14th International Joint Conference on Computer Science and Software Engineering (JCSSE). IEEE, 2017. (Year: 2017).*
International Search Report and Written Opinion for PCT Application No. PCT/US17/58995 dated Feb. 1, 2018.
International Search Report and Written Opinion for PCT Application No. PCT/US17/63034 dated Feb. 12, 2018.
International Search Report and Written Opinion for PCT Application No. PCT/US18/20857 dated Apr. 24, 2018.
"Real-time speaker identification and verification.", Kinnunen, T., Karpov, E., & Franti, P. (2006). Real-time speaker identification and verification. IEEE Transactions on Audio, Speech , and Language Processing, 14(1), 277-288. (Year: 2006).
Azarbonyad, Hosein , et al., "Hierarchical Re-estimation of Topic Models for Measuring Topical Diversity", arXiv, pp. 1-12, Jan. 16, 2017.
Cao, Huanhuan , et al., "Context-Aware Query Clasification", ACM SIGIR'09, Jul. 19-23, 2009.
Deng, L. , "Ensemble deep learning for speech recognition", In Fifteenth Annual Conference of the International Speech Communication Association. (Year 2014).
Graesser, Arthur C., et al., "AutoTutor: A tutor with dialogue in natural language", Behavior Research Methods, Instruments & Computers 2004, 36 (2), pp. 180-192.
Graesser, Arthur C., et al., "Intelligent Tutoring Systems with Conversational Dialogue", AI Magazine vol. 22, No. 4 (2001) (© AAAI), pp. 39-52.
Har-Peled, Sariel , et al., "Constraint Classification for Multiclass Classification and Ranking", 2003 [Online] Downloaded Sep. 23, 2019 http://papers.nips.cc/paper/2295-constraint-classification-for-multiclass-classification-and-ranking.pdf (Year: 2003).
John, George H., et al., "Irrelevant features and the subset selection problem. In Machine Learning Proceedings 1994 (pp. 121-129)".
Lin, Shin-Wei , et al., "Particle swarm optimization for parameter determination and feature selection of support vector machines. ScienceDirect, Expert Systems with Applications 35 (2008) 1817-1824".
Litman, Diane J., et al., "ITSPOKE: An Intelligent Tutoring Spoken Dialogue System", HLT-NAACL—Demonstrations 04 Demonstration Papers at HTL-NAACL, pp. 5-8, May 2-7, 2004.
Sakagami, Y. , et al., "The intelligent ASIMO: System overview and integration", IEEE/RSJ International Conference on Intelligent Robots and Systems Sep. 30-Oct. 4, 2002, pp. 2478-2483.
Serban, Julian V., et al., "A Deep Reinforcement Learning Chatbot", Montreal Institute for Learning Algorithms, Montreal, Quebec, Canada, arXiv preprint arXiv: 1709.02349, Nov. 5, 2017.
Williams, Adina , et al., "A Broad-Coverage Challenge Corpus for Sentence Understanding through Inference", arXiv, pp. 1-11, Feb. 19, 2018.
Zhang, X.L. , et al., "Boosting contextual information for deep neural network based voice activity detection", IEEE/ACM Transactions on Audio, Speech and Language Processing (TASLP), 24(2), 252-264. (Year 2016).

(56) References Cited

OTHER PUBLICATIONS

Zhang, X.L., et al., "Deep belief networks based voice activity detection", IEEE Transactions on Audio, Speech, and Language Processing, 21(4), 697-710. (Year: 2013).

* cited by examiner

Sourcing Machine Learning Training Data S210

Vectorizing Training Data Instances S220

Computing Characteristics of Training Data Corpus S230

Enumerating Instances of Corpus S235

Identifying Anomalous Instances S240

Validating/Invalidating Anomalous Instances S245

Re-Seeding and Sourcing New Training Data S250

FIGURE 2

SYSTEMS AND METHODS FOR AUTOMATICALLY CONFIGURING TRAINING DATA FOR TRAINING MACHINE LEARNING MODELS OF A MACHINE LEARNING-BASED DIALOGUE SYSTEM INCLUDING SEEDING TRAINING SAMPLES OR CURATING A CORPUS OF TRAINING DATA BASED ON INSTANCES OF TRAINING DATA IDENTIFIED AS ANOMALOUS

CROSS-REFERENCE TO RELATED APPLICATIONS

This application claims the benefit of U.S. Provisional Application No. 62/779,236, filed 13 Dec. 2018, and U.S. Provisional Application No. 62/829,289, filed 4 Apr. 2019, which are incorporated in their entirety by this reference.

GOVERNMENT RIGHTS

The subject matter of the invention may be subject to U.S. Government Rights under National Science Foundation grants: NSF SBIR Phase 1 Grant-1622049 and NSF SBIR Phase 2 Grant-1738441.

TECHNICAL FIELD

The inventions herein relate generally to the machine learning and artificially intelligent dialogue systems fields, and more specifically to a new and useful system and method for intelligently training machine learning models of a machine learning-based conversational service in the machine learning field.

BACKGROUND

Modern virtual assistants and/or online chatbots may typically be employed to perform various tasks or services based on an interaction with a user. Typically, a user interacting with a virtual assistant may pose a question or otherwise submit a command to the virtual assistant to which the virtual assistant may provide a response or a result. Many of these virtual assistants may be implemented using a rules-based approach, which typically requires coding or preprogramming many or hundreds of rules that may govern a manner in which the virtual assistant should operate to respond to a given query or command from a user.

While the rules-based approach for implementing a virtual assistant may be useful for addressing pointed or specific queries or commands made by a user, the rigid or finite nature of this approach severely limits a capability of a virtual assistant to address queries or commands from a user that exceed the scope of the finite realm of pointed and/or specific queries or commands that are addressable by the finite set of rules that drive the response operations of the virtual assistant.

That is, the modern virtual assistants implemented via a rules-based approach for generating responses to users may not fully satisfy queries and commands posed by a user for which there are no predetermined rules to provide a meaningful response or result to the user.

Additionally, while machine learning enhances capabilities of artificially intelligent conversational systems, inefficiencies continue to persist in training the underlying machine learning models performing classification and predictive functions of the artificially intelligent conversation systems.

Therefore, there is a need in the machine learning field for systems and methods that enable rapid and efficient training of machine learning models and for a flexible virtual assistant solution that is capable of evolving beyond a finite set of rules for effectively and conversantly interacting with a user. The embodiments of the present application described herein provide technical solutions that address, at least, the need described above, as well as the deficiencies of the state of the art described throughout the present application.

BRIEF DESCRIPTION OF THE FIGURES

FIG. 2 illustrates an example method in accordance with one or more embodiments of the present application;

BRIEF SUMMARY OF THE INVENTION(S)

Figure 1:
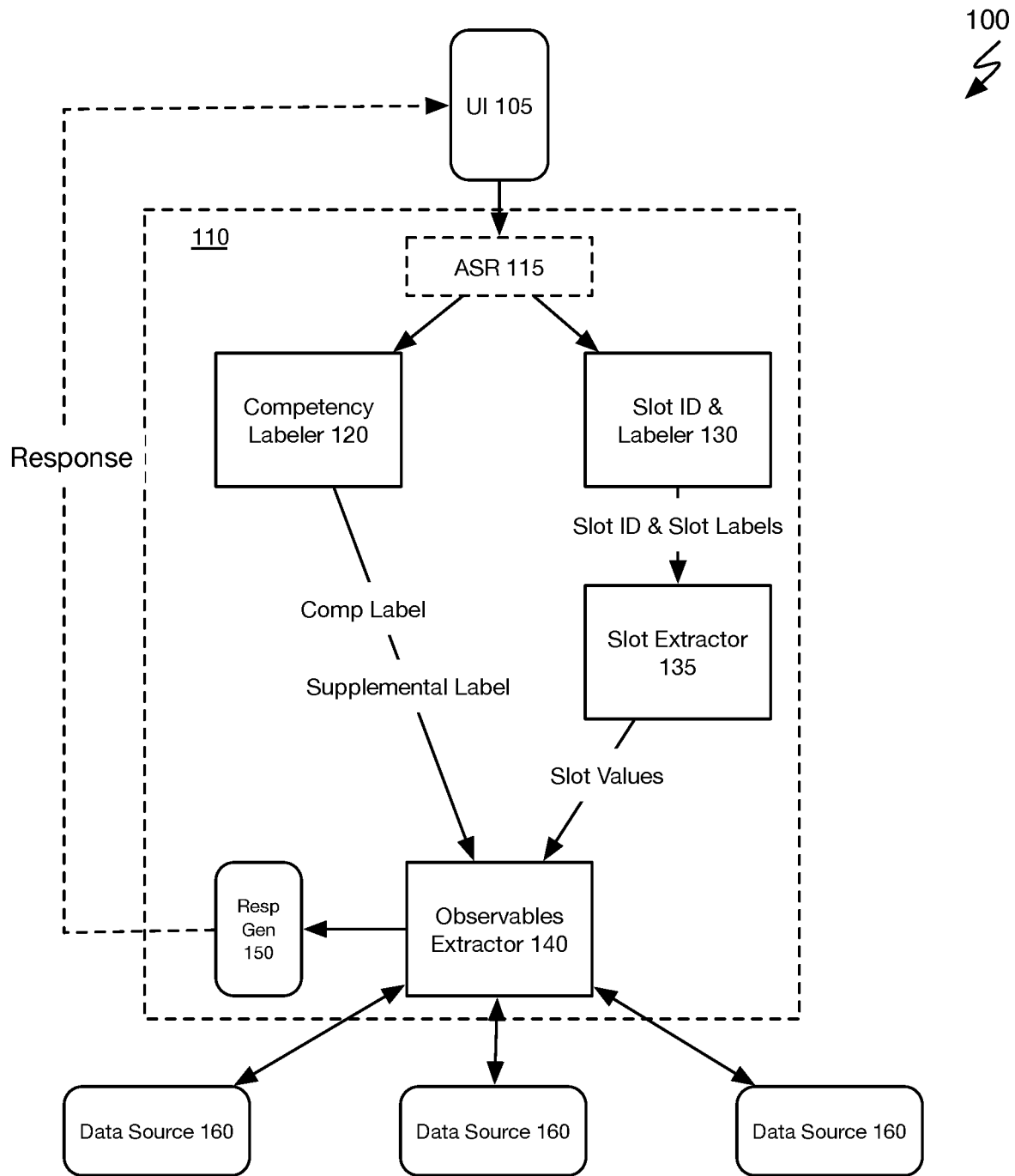
FIG. 1 illustrates a schematic representation of a system 100 in accordance with one or more embodiments of the present application.
Figure 1A:
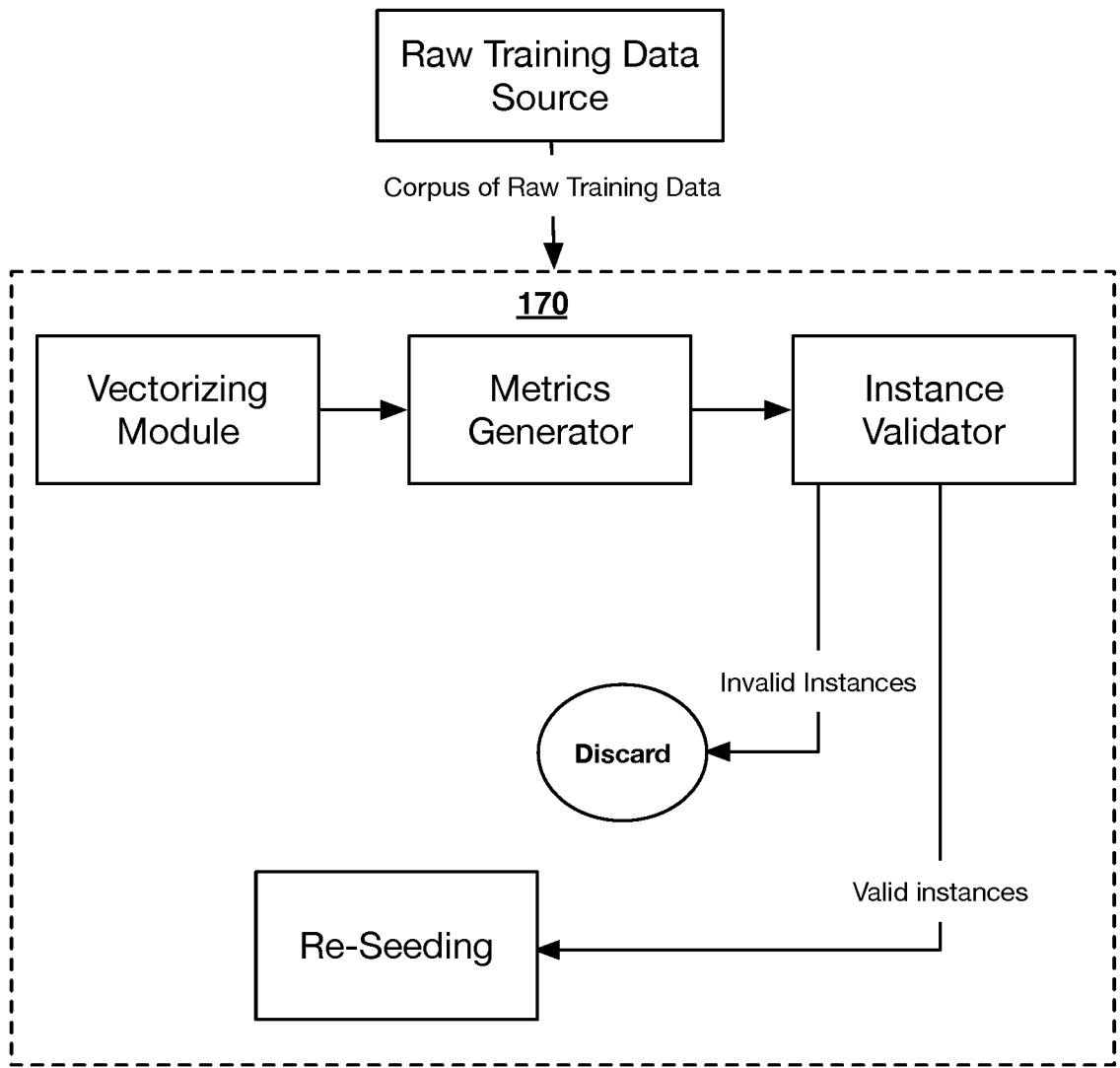
FIG. 1A illustrates a schematic representation of a sub-system of system 100 in accordance with one or more embodiments of the present application.

In one embodiment, a system for identifying anomalous training data samples and intelligently forming a corpus of training data for improving a machine learning-based dialogue system includes: a machine learning-based automated dialogue service implementing by one or more hardware computing servers that: sources a corpus of raw machine learning training data from one or more sources of training data based on a seeding sample set that includes a plurality of seed training samples; generates a vector representation for each instance of training data in the corpus of raw machine learning training data; identifies statistical characteristics of the corpus of raw machine learning training data based on a mapping of the vector representation for each instance of training data within the corpus of raw machine learning training data; identifies, as anomalous instances, each of one or more instances of training data of the corpus of raw machine learning training data based on the identified statistical characteristics; and curates the corpus of raw machine learning training data based on each of the one or more instances of training data identified as anomalous instances.

In one embodiment, the machine learning-based automated dialogue service further: defines a re-seeding sample set that includes a plurality of re-seeding training samples, wherein each of the plurality of re-seeding training samples comprises a distinct one of the one or more anomalous instances; sources a re-seeding corpus of raw machine learning training data from one or more sources of training data based on the re-seeding sample set comprising the plurality of re-seeding training samples based on the one or more anomalous instances; and constructs a joint corpus of training data that includes a synthesis of [i] the corpus of raw machine learning training data and [ii] the re-seeding corpus of raw machine learning training data.

In one embodiment, method for identifying anomalous training data samples and intelligently forming a corpus of training data for improving a machine learning-based dialogue system includes: sourcing a corpus of raw machine learning training data from one or more sources of training data based on a plurality of seed training samples, wherein the corpus of raw machine learning training data comprises a plurality of distinct instances of training data; generating a vector representation for each distinct instance of training data in the corpus of raw machine learning training data; identifying statistical characteristics of the corpus of raw machine learning training data based on a mapping of the vector representation for each distinct instance of training data within the corpus of raw machine learning training data; identifying one or more anomalous instances of the plurality of distinct instances of training data of the corpus of raw machine learning training data based on the identified statistical characteristics of the corpus; and curating the corpus of raw machine learning training data based on each of the one or more instances of training data identified as anomalous instances.

In one embodiment, the one or more anomalous instances relate to one or more instances of training data identified within the corpus of raw machine learning training data having vector representations that satisfies or exceeds a target threshold based on a mean vector representation of the corpus of raw machine learning training data.

In one embodiment, the plurality of seed training samples comprise a plurality of example utterances and/or prompts for a specific dialogue intent of a machine learning-based automated dialogue system.

In one embodiment, the method includes defining a re-seeding sample set that includes a plurality of re-seeding training samples, wherein each of the plurality of re-seeding training samples comprises a distinct one of the one or more anomalous instances.

In one embodiment, the method includes sourcing a re-seeding corpus of raw machine learning training data from one or more sources of training data based on the re-seeding sample set comprising the plurality of re-seeding training samples based on the one or more anomalous instances.

In one embodiment, the method includes constructing a joint corpus of training data that includes a synthesis of [i] the corpus of raw machine learning training data and [ii] the re-seeding corpus of raw machine learning training data.

In one embodiment, each instance of training data of the corpus of raw machine learning training data comprises a word or a sentence for performing a training of a machine learning model of a machine learning-based automated dialogue system, generating the vector representation for each instance of training data includes: computing a vector value for each instance of training data using one or more sentence embedding techniques or one or more word embedding techniques.

In one embodiment, identifying the statistical characteristics of the corpus of raw machine learning training data includes: computing a centroid of the corpus of raw machine learning training data based on the vector representation for each instance of training data within the corpus of raw machine learning training data.

In one embodiment, identifying the statistical characteristics includes: computing a distance value from a centroid of the corpus of raw machine learning training data for each instance of training data within the corpus of raw machine learning training data.

In one embodiment, the method includes enumerating each instance of training data of the corpus of raw machine learning training data in an ascending order or a descending order based on the computed distance value for each instance of training data.

In one embodiment, identifying one or more anomalous instances of the plurality of distinct instances of training data of the corpus of raw machine learning training data includes: evaluating the computed distance value for each distinct instance of training data against an anomaly threshold.

In one embodiment, the method includes identifying a density of the plurality of distinct instances of training data based on a mapping of the vector representation for each distinct instance of training data within the corpus, wherein the density of the plurality of distinct instances relates to a cluster or a grouping of distinct instances of training data of the corpus of raw machine learning training data in which each distinct instance of training data is within a predetermined distance of another distinct instance of training data within the cluster or the grouping; setting an anomaly threshold based on identifying an absolute distance value away from a centroid of the density of the plurality of distinct instances, wherein a distal end of the absolute distance falls along an area beyond the density of the plurality of distinct instances, wherein identifying the one or more anomalous instances includes: identifying a given distinct instance as one of the one or more anomalous instances if a distance value for the given distinct instance away from a centroid of the density satisfies or exceeds the anomaly threshold.

In one embodiment, the method includes generating a graphical representation of the plurality of distinct instances of training data of the corpus of raw machine learning training data based on the vector representation for each distinct instance of training data, wherein identifying the one or more anomalous instances includes: identifying a given instance as one of the one or more anomalous instances if the given instance is visually distant from a density or a cluster of distinct instances of training data within the corpus.

In one embodiment, the method includes evaluating each of the one or more anomalous instances of the corpus of raw machine learning training data, wherein the evaluating includes determining for each of the one or more anomalous instances whether a dialogue intent classification label associated with a respective one of the one or more anomalous instances matches an identified dialogue intent of the respective one of the one or more anomalous instances.

In one embodiment, the method includes identifying whether each respective one of the one or more anomalous instances comprises a valid anomalous instance or an invalid anomalous instance, wherein: a valid anomalous instance relates to an instance of training data that (a) overlaps or shares in a same or a similar semantic meaning as an average training data sample instance from the corpus of raw machine learning training data or (b) overlaps or shares in a same or a similar semantic meaning as a seed training sample of the seeding sample set, and an invalid anomalous instance relates to an instance of training data that (a) fails to overlap or does not share in a same or a similar semantic meaning as an average training data sample instance from the corpus of raw machine learning training data or (b) fails to overlap or does not share in a same or a similar semantic meaning as a seed training sample of the seeding sample set.

In one embodiment, curating the corpus of raw machine learning training data includes: if a distinct one of the one or more anomalous instances is identified as the invalid anomalous instance, reducing the corpus of raw machine learning training data by discarding the invalid anomalous instance.

In one embodiment, the method includes defining a re-seeding sample set that includes a plurality of valid anomalous instances; and sourcing a re-seeding corpus of raw machine learning training data from one or more sources of training data based on the plurality of valid anomalous instances.

In one embodiment, the method includes calculating one or more efficacy metrics of the joint corpus of training data, wherein calculating the one or more efficacy metrics includes calculating one or more of a coverage metric value and a diversity metric value of the joint corpus of training data; sourcing additional re-seeding corpora of raw machine learning training data until a coverage metric threshold and/or a diversity metric threshold of a resulting joint corpus of raw machine learning training data is satisfied by one or more of the coverage metric value and the diversity metric value, wherein the resulting joint corpus of raw machine learning training data combines each of the corpus of raw machine learning training data, the re-seeded corpus of raw machine learning training data, and all subsequent re-seeded corpus of raw machine learning training data.

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

Overview

As discussed above, existing virtual assistant implementations do not have the requisite flexibility to address unrecognized queries or commands from user in which there are no predetermined rules designed around narrowly defined intents. This inflexible structure cannot reasonably and efficiently address the many variances in the manners in which a user may pose a query or command to the virtual assistant.

The embodiments of the present application, however, provide an artificially intelligent machine learning-based dialogue service and/or system with natural language processing capabilities that function to process and comprehend structured and/or unstructured natural language input from a user or input from any other suitable source and correspondingly provide highly conversant responses to dialogue inputs to the system. Using one or more trained (deep) machine learning models, such as long short-term memory (LSTM) neural network, the embodiments of the present application may function to understand any variety of natural language utterance or textual input provided to the system. The one or more deep machine learning models post deployment can continue to train using unknown and previously incomprehensible queries or commands from users. As a result, the underlying system that implements the (deep) machine learning models may function to evolve with increasing interactions with users and training rather than being governed by a fixed set of predetermined rules for responding to narrowly defined queries, as may be accomplished in the current state of the art.

Accordingly, the evolving nature of the artificial intelligence platform described herein therefore enables the artificially intelligent virtual assistant latitude to learn without a need for additional programming and the capabilities to ingest complex (or uncontemplated) utterances and text input to provide meaningful and accurate responses.

Additionally, systems and methods are provided that enable an intelligent curation of training data for machine learning models that enable a rapid and efficient training of machine learning models employed in a machine learning-based dialogue system.

1. System for a Machine Learning-Based Dialogue System

As shown in FIG. 1, a system 100 that automatically trains and/or configures machine learning models includes an artificial intelligence (AI) virtual assistant platform 110 (e.g., artificially intelligent dialogue platform), a machine learning configuration interface 120, a training/configuration data repository 130, a configuration data queue 135, and a plurality of external training/configuration data sources 140. Additionally, the system 100 may include an anomaly detection sub-system 170 that may function to receive training data samples as input and identify anomalous instances within the training data samples.

Generally, the system 100 functions to implement the artificial intelligence virtual assistant platform 110 to enable intelligent and conversational responses by an artificially intelligent virtual assistant to a user query and/or user command input into the system 100, as described in U.S. patent application No. 15/797,414 and U.S. patent application No. 15/821,010, which are both incorporated herein in their entireties by this reference. Specifically, the system 100 functions to ingest user input in the form of text or speech into a user interface 160. At natural language processing components of the system 100 that may include, at least, the competency classification engine 120 the slot identification engine 130, and a slot value extractor 135, the system 100 functions to identify a competency classification label for the user input data and parse the user input data into comprehensible slots or segments that may, in turn, be converted into program-comprehensible and/or useable features. Leveraging the outputs of the natural language processing components of the system 100, the observables extractor 140 may function to generate handlers based on the outcomes of the natural language processing components and further, execute the generated handlers to thereby perform various operations that accesses one or more data sources relevant to the query or command and that also performs one or more operations (e.g., data filtering, data aggregation, and the like) to the data accessed from the one or more data sources.

The artificial intelligence virtual assistant platform 110 functions to implement an artificially intelligent virtual assistant capable of interacting and communication with a user. The artificial intelligence platform 110 may be implemented via one or more specifically configured web or private computing servers (or a distributed computing system; e.g., the cloud) or any suitable system for implementing the system 100 and/or the method 200.

In some implementations, the artificial intelligence virtual assistant platform 110 may be a remote platform implemented over the web (e.g., using web servers) that is configured to interact with distinct and disparate service providers. In such implementation, an event such as a user attempting to access one or more services or data from one or more data sources of the service provider may trigger an implementation of the artificially intelligent virtual assistant of the AI platform 110. Thus, the AI virtual assistant platform 110 may work in conjunction with the service provider to attend to the one or more queries and/or commands of the users of the service provider. In this implementation, the data sources 160 may be data sources of the service provider that are external data sources to the AI virtual assistant platform 110.

The competency classification engine 120 together with the slot identification engine 130 and the slot value extractor 135 preferably function to define a natural language processing (NLP) component of the artificial intelligence platform 110. In one implementation, the natural language processing component may additionally include the automatic speech recognition unit 105.

The competency classification engine 120 functions to implement one or more competency classification machine learning models to label user input data comprising a user query or a user command. The one or more competency classification machine learning models may include one or more deep machine learning algorithms (e.g., a recurrent neural network, etc.) that have been specifically trained to identify and/or classify a competency label for utterance input and/or textual input. The training input used in training the one or more deep machine learning algorithms of the competency classification engine 120 may include crowdsourced data obtained from one or more disparate user query or user command data sources and/or platforms (e.g., messaging platforms, etc.). However, it shall be noted that the system 100 may obtain training data from any suitable external data sources. The one or more deep machine learning algorithms may additionally be continually trained using user queries and user commands that were misspredicted or incorrectly analyzed by the system 100 including the competency classification engine 120.

The competency classification engine 120 may additionally be configured to generate or identify one competency classification label for each user query and/or user command input into the engine 120. The competency classification engine 120 may be configured to identify or select from a plurality of predetermined competency classification labels (e.g., Income, Balance, Spending, Investment, Location, etc.). Each competency classification label available to the competency classification engine 120 may define a universe of competency-specific functions available to the system 100 or the artificially intelligent assistant for handling a user query or user command. That is, once a competency classification label is identified for a user query or user command, the system 100 may use the competency classification label to restrict one or more computer-executable operations (e.g., handlers) and/or filters that may be used by system components when generating a response to the user query or user command. The one or more computer-executable operations and/or filters associated with each of the plurality of competency classifications may be different and distinct and thus, may be used to process user queries and/or user commands differently as well as used to process user data (e.g., transaction data obtained from external data sources 160).

Additionally, the competency classification machine learning model 120 may function to implement a single deep machine learning algorithm that has been trained to identify multiple competency classification labels. Alternatively, the competency classification machine learning model 120 may function to implement an ensemble of deep machine learning algorithms in which each deep machine learning algorithm of the ensemble functions to identify a single competency classification label for user input data. For example, if the competency classification model 120 is capable of identifying three distinct competency classification labels, such as Income, Balance, and Spending, then the ensemble of deep machine learning algorithms may include three distinct deep machine learning algorithms that classify user input data as Income, Balance, and Spending, respectively. While each of the deep machine learning algorithms that define the ensemble may individually be configured to identify a specific competency classification label, the combination of deep machine learning algorithms may additionally be configured to work together to generate individual competency classification labels. For example, if the system receives user input data that is determined to be highly complex (e.g., based on a value or computation of the user input data exceeding a complexity threshold), the system 100 may function to selectively implement a subset (e.g., three machine learning algorithms from a total of nine machine learning algorithms or the like) of the ensemble of machine learning algorithms to generate a competency classification label.

Additionally, the competency classification engine 120 may be implemented by the one or more computing servers, computer processors, and the like of the artificial intelligence virtual assistance platform 110.

The slot identification engine 130 functions to implement one or more machine learning models to identify slots or meaningful segments of user queries or user commands and to assign a slot classification label for each identified slot. The one or more machine learning models implemented by the slot identification engine 130 may implement one or more trained deep machine learning algorithms (e.g., recurrent neural networks). The one or more deep machine learning algorithms of the slot identification engine 130 may be trained in any suitable manner including with sample data of user queries and user commands that have been slotted and assigned slot values and/or user system derived examples. Alternatively, the slot identification engine 130 may function to implement an ensemble of deep machine learning algorithms in which each deep machine learning algorithm of the ensemble functions to identify distinct slot labels or slot type labels for user input data. For example, slot identification engine 130 may be capable of identifying multiple distinct slot classification labels, such as Income, Account, and Date labels, then the ensemble of deep machine learning algorithms may include three distinct deep machine learning algorithms that function to classify segments or tokens of the user input data as Income, Account, and Date, respectively.

A slot, as referred to herein, generally relates to a defined segment of user input data (e.g., user query or user command) that may include one or more data elements (e.g., terms, values, characters, media, etc.). Accordingly, the slot identification engine 130 may function to decompose a query or command into defined, essential components that implicate meaningful information to be used when generating a response to the user query or command.

A slot label which may also be referred to herein as a slot classification label may be generated by the one or more slot classification deep machine learning models of the engine 130. A slot label, as referred to herein, generally relates to one of a plurality of slot labels that generally describes a slot (or the data elements within the slot) of a user query or user command. The slot label may define a universe or set of machine or program-comprehensible objects that may be generated for the data elements within an identified slot.

Like the competency classification engine 120, the slot identification engine 120 may implement a single deep machine learning algorithm or an ensemble of deep machine learning algorithms. Additionally, the slot identification engine 130 may be implemented by the one or more computing servers, computer processors, and the like of the artificial intelligence virtual assistance platform 110.

The machine learning models and/or the ensemble of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in implementing the artificially intelligent virtual assistant and/or other components of the system 100.

The slot value extraction unit 135 functions to generate slot values by extracting each identified slot and assigned slot label of the user query or user command and converting the data elements (i.e., slot data) within the slot to a machine or program-comprehensible object or instance (e.g., term or value); that is, the slot label is mapped to coding or data that a computer or program of the system 100 comprehends and is able to manipulate or execute processes on. Accordingly, using the slot label generated by the slot identification engine 130, the slot extraction unit 135 identifies a set or group of machine or program-comprehensible objects or instances that may be applied to slot data of a slot assigned with the slot label. Thus, the slot extraction unit 135 may convert the slot data of a slot to a machine or program-comprehensible object (e.g., slot values) based on the slot label and specifically, based on the available objects, instances, or values mapped to or made available under the slot label.

The observables extractor 140 functions to use the slot values comprising the one or more program-comprehensible objects generated at slot extraction unit 135 to determine or generate one or more handlers or subroutines for handling the data of or responding to the user query or user command of user input data. The observables extractor 140 may function to use the slot values provided by the slot extraction unit 135 to determine one or more data sources relevant to and for addressing the user query or the user command and determine one or more filters and functions or operations to apply to data accessed or collected from the one or more identified data sources. Thus, the coding or mapping of the slot data, performed by slot extraction unit 135, to program-comprehensible objects or values may be used to specifically identify the data sources and/or the one or more filters and operations for processing the data collected from the data sources.

The response generator 150 functions to use the competency classification label of the user input data to identify or select one predetermined response template or one of a plurality of predetermined response templates. For each competency classification label of the system 100, the system 100 may have stored a plurality of response templates that may be selected by the response generator 150 based on an identified competency classification label for user input data. Additionally, or alternatively, the response template may be selected based on both the competency classification label and one or more generated slot values. In such instance, the one or more slot values may function to narrow the pool of response template selectable by the response generator to a subset of a larger pool of response templates to consider the variations in a query or user command identified in the slot values. The response templates may generally a combination of predetermined output language or text and one or more input slots for interleaving the handler outputs determined by the observables extractor 140.

The user interface system 105 may include any type of device or combination of devices capable of receiving user input data and presenting a response to the user input data from the artificially intelligent virtual assistant. In some embodiments, the user interface system 105 receives user input data in the form of a verbal utterance and passes the utterance to the automatic speech recognition unit 115 to convert the utterance into text. The user interface system 105 may include, but are not limited to, mobile computing devices (e.g., mobile phones, tablets, etc.) having a client application of the system 100, desktop computers or laptops implementing a web browser, an automated teller machine, virtual and/or personal assistant devices (e.g., Alexa, Google Home, Cortana, Jarvis, etc.), chatbots or workbots, etc. An intelligent personal assistant device (e.g., Alexa, etc.) may be any type of device capable of touchless interaction with a user to performing one or more tasks or operations including providing data or information and/or controlling one or more other devices (e.g., computers, other user interfaces, etc.). Thus, an intelligent personal assistant may be used by a user to perform any portions of the methods described herein, including the steps and processes of method 200, described below. Additionally, a chatbot or a workbot may include any type of program (e.g., slack bot, etc.) implemented by one or more devices that may be used to interact with a user using any type of input method (e.g., verbally, textually, etc.). The chatbot or workbot may be embedded or otherwise placed in operable communication and/or control of a communication node and thus, capable of performing any process or task including, but not limited to, acquiring and providing information and performing one or more control operations.

2. Method for Intelligently Identifying Anomalous Training Data Samples and Improving a Machine Leaning Training Dataset for Configuring Machine Learning Models of a Machine Learning-Based Dialogue System As shown in FIG. 2, a method 200 for anomaly detection when curating machine learning training data includes sourcing machine learning training data S210, generating a vector representation of each instance in a selected corpus of raw machine learning training data S220, computing one or more statistical metrics of the corpus of raw machine learning training data S230, identifying one or more anomalous instances within the corpus of training data S240, and re-seeding for sourcing new machine learning training data S250. The method 200 optionally includes enumerating each instance of the corpus of raw machine learning training data S235 and validating or invalidating an anomalous instance S245.

The method 200 functions to enable a rapid and intelligent training of one or more machine learning models implemented within an artificially intelligent conversational system described or the like, as described in U.S. patent application Ser. No. 15/797,414 and U.S. patent application Ser. No. 15/821,010, which are both incorporated in their entireties in this application by this reference.

2.1 Sourcing Machine Learning Training Data

S210, which includes sourcing machine learning training data, functions to enable a configuration and/or setting of one or more training data sourcing parameters for sourcing a corpora of raw machine learning training data from one or more sources (e.g., one or more crowdsourcing platforms, etc.) of training data. The one or more training data sourcing parameters for sourcing the corpora of training data preferably include classification intent-specific descriptions, prompts, or utterance examples (herein after may be referred to as "seed samples") that define a scope for sourcing and/or generating suitable training data for a given intent classification task, a given inferential task, an intent-specific machine learning model (classifier), and/or a slot value classification and/or inferential models (i.e., SVP), as described in U.S. patent application Ser. No. 15/821,010, which was previously incorporated by reference herein in its entirety.

Preferably, S210 may function to source the corpora of raw machine learning training data for training and improving one or more machine learning algorithms used in implementing an artificially intelligent dialogue system (e.g., system 100) or the like from one or more remote crowdsourcing platforms. However, it shall be noted that S210 may be implemented to configure training data sourcing parameters for sourcing machine learning training data for any suitable system or the like that implement machine learning algorithms for performing classification tasks and/or inference tasks based on any suitable input values.

In a preferred embodiment, a corpora of raw machine learning training data includes a plurality of distinct corpus of machine learning training data. In such embodiment, each of the plurality of distinct corpus of machine learning training data may be generated and/or collected for the purposes of training an ensemble of distinct machine learning classifiers used for classifying user utterances or user input in a deployed dialogue system and for training models that perform inferential tasks as well as models that perform slot value classification and/or inference. For instance, a corpora of raw machine learning training data may include forty-seven (47) distinct corpus of machine training data, for example, for training 47 distinct machine learning classifiers implemented within a deployed dialogue system or the like. In such example, each of the 47 distinct machine learning classifiers may be implemented for categorizing and/or classifying user input (e.g., utterance input) according to one of the 47 distinct classification intents of the deployed system.

In some embodiments, S210 may additionally function to define a set of example utterances and/or prompts (seed samples) for sourcing raw machine learning training data for each of a plurality of intent classification tasks and/or for each distinct machine learning classifier of an artificially intelligent dialogue system. In some embodiments, the seed samples preferably relate to examples of possible utterances or examples of possible prompts, queries, or statements that may be covered by a specific dialogue intent. In some embodiments, the set of prompts may be engineered based on a definition and/or specification of an intent classification task or the like. For instance, an engineer or a developer associated with a dialogue system may function to generate a set of prompts based on their understanding of the intent classification tasks of a deployed dialogue system or the like.

Additionally, or alternatively, S210 may function to generate the set of prompts based on historical or real user queries and/or user commands. In one implementation, S210 may function to randomly sample a predetermined number of user utterances from a deployed system and convert the random samples into prompts for constructing paraphrasing requests for sourcing training data. In another implementation, S210 may function to randomly sample a predetermined number of user utterances from a machine learning test corpus and convert the random samples into prompts for constructing scenario-driven prompts and paraphrasing requests for sourcing training data.

In a first implementation, S210 may function to define training data sourcing parameters comprising a set of prompts for sourcing raw machine learning training data for a classification intent. The set of prompts may define a set of scenarios that enable the generation of raw machine learning data responsive to the scenario. Accordingly, S210 may function to define instructions for a scenario-driven request for raw machine learning training data from a remote crowdsourcing platform or the like. In the scenario-driven approach, the set of prompts describe or include real-world situations or circumstances that requires or prompts responses to the real-world circumstances or situations. The responses to the real-world situation of a prompt preferably comprises raw machine learning training data. Suitably, a scenario-driven prompt functions to simulate real world situations that enable the creation of natural user queries and/or commands (requests) resembling real user queries and/or commands.

In a first variation, S210 may function to define a set of prompts for sourcing raw machine learning training data for an intent classification task that may include defining a generic (coarse) scenario in which a broad or general description of a real-world (or similar) situation related to a targeted classification intent without additional instructions constraining a manner in which a response to the scenario may be provided. For example, a generic scenario for a specific intent may be "You want to know about your account balance" and does not include further instructions for guiding and/or providing responses to the generic scenario.

In a second variation, S210 may function to define a set of prompts for sourcing raw machine learning training data for a classification intent may include defining a specific (granular) scenario of a real-world (or similar) situation related to a targeted classification intent in which additional details beyond a generic scenario may be provided to generate responses to the specific scenario with more modifiers or constraints. In some embodiments, a specific scenario may additionally include specific requirements relating to information that is required to be included in a response to the specific scenario. For example, a specific scenario for a specific intent may be "You'd like to know the balance of one of your accounts. (Please specify the account you want to inquire about in your responses)".

Additionally, or alternatively, S210 may function to construct a composition and/or mixture of generic scenarios and specific scenarios for sourcing raw machine learning training data for a specific intent classification task. The composition or mixture may include any suitable ratio between generic and specific scenarios; however, in a preferred embodiment, in an optimal composition or mixture, S210 may function to include a higher ratio of specific scenarios than a ratio of generic scenarios to yield an improved corpus of raw machine learning training data.

In a second implementation, S210 may function to define a set of prompts for sourcing raw machine learning training data for a classification intent may include defining a request or instruction for rephrasing and/or paraphrasing the set of prompts (or statements, sentences, etc.) where the resulting response (i.e., the rephrasing or the paraphrasing) comprises the raw machine learning training data for the classification intent. In some embodiments, S210 may function to construct the set of prompts for the paraphrasing request based on converting one or more scenario-driven prompts. In such embodiments, a scenario-driven prompt may be converted to a user query or a user command that should be rephrased or paraphrased. Accordingly, depending on a source of the scenario-driven prompt, S210 may function to generate one of two types of paraphrasing prompts including one of a generic prompt and a specific prompt.

Additionally, or alternatively, S210 may function to construct a composition and/or mixture of scenario-driven prompts and paraphrasing requests for sourcing raw machine learning training data for a specific intent classification task and/or for any suitable number of intent classification tasks. The composition or mixture of scenario prompts and paraphrasing prompts may include any suitable ratio between scenarios and requests for paraphrasing; however, in a preferred embodiment, in an optimal composition or mixture, S210 may function to include a higher ratio of scenario-driven prompts than a ratio of paraphrasing requests to yield an improved corpus of raw machine learning training data. For example, a composition of training data sourcing prompts may include a predetermined number of prompts in which the scenario-driven prompts make up 60% of the population (or set) and paraphrasing prompts constitute the remaining 40% of the population of training data sourcing prompts.

Accordingly, in one or more embodiments, S210 may function to set a variety of training data sourcing parameters including: [1] a setting a prompt generation source or prompt generation parameters (e.g., selecting test sampled (real) user queries and/or engineered queries) for constructing scenario-driven prompts and paraphrasing prompts; and [2] setting a composition or mixture of training data sourcing prompts (e.g., setting mixture ratios, etc.). As discussed below, the training data sourcing parameters, in some embodiments, may be automatically adjusted or reconfigured according to one or more calculated training data quality metrics and/or thresholds.

In one or more embodiments, S210 may additionally or alternatively function to automatically adjust one or more training data sourcing parameters including prompt generation parameters and a composition or a mixture of training data sourcing prompts based on one or more training data quality metrics and/or training data quality thresholds. In some embodiments, S210 may function to automatically reconfigure training data sourcing parameters based on one or more of calculated coverage metrics of a corpora of raw machine learning training corpora, diversity metrics of the corpora of raw machine learning training data, and/or performance (e.g., accuracy metrics, etc.) metrics of one or more machine learning algorithms trained using the corpora of raw machine learning training data.

Accordingly, if one or more metrics of the corpora of raw machine learning training data do not satisfy one or more training data quality thresholds (e.g., a minimum coverage threshold, a minimum diversity threshold, etc.) and/or if one or more performance metrics of the one or more machine learning algorithms trained using the corpora of training data do no satisfy performance metrics (e.g., accuracy metrics, etc.), S210 may function to automatically adjust or reconfigure one or more training data sourcing parameters to increase/decrease proportions and/or add/remove historical (real) user queries/commands and proportions of engineered user queries/commands in a mixture or composition. S210 may additionally or alternatively automatically adjust prompt generation parameters by increasing/decreasing the historical queries/commands and/or the engineered queries/commands used in constructing prompts.

S210 may additionally or alternatively function to launch one or more requests for machine learning training data to one or more training data sources based on setting the one or more training data sourcing parameters. In some embodiments, the one or more requests for machine learning training data may be provided as input into one or more distinct training data request templates. In such embodiments, the method 200 or a related method or system may function to construct the distinct training data request templates according to a configuration of each of the one or more training data sources.

S210 may additionally or alternatively function to collect raw machine learning training data from the one or more training data sources in response to the one or more requests for machine learning training data. In a preferred embodiment, the machine learning training data from each of the training data sources comprise a plurality of labeled training data samples proliferated based on or using the training data sourcing parameters. Accordingly, the machine learning training data returned from the one or more training data sources may include a large number (e.g., hundreds, thousands, millions, etc.) of labeled training data samples that are variants of the paraphrasing prompts or responsive to the scenario-driven prompts.

2.2 Training Data Vectorization (Sentence Representation)

S220, which includes generating a vector representation of each instance in a selected corpus of raw machine learning training data, may function to convert each instance within a corpus of training data to a vector value. In a preferred embodiment, S220 may function to use one or more sentence embedding techniques to map each of the instances within the corpus of training data into the vector space. It shall be noted that while S220 preferably functions to employ sentence embedding techniques to generate vector or sentence representations for each instance within a corpus of training data, S220 may additionally or alternatively use any suitable technique to construct a representation of each instance within a corpus in order to generate a mapping in n-dimensional space of each instance within the corpus and identify any anomalous instances within the corpus.

Accordingly, sentence embedding may include a set of techniques that map instances of sentences, words, and/or phrases identified within the corpus of training data to vectors of real numbers. Thus, in an example mapping of vector values for a target corpus of training data, the instances of training data that may be closest in meaning or relation may have vector values that are close in proximity (e.g., a mapping relation between two vector values that satisfies a proximity or relationship threshold). Conversely, instances of training data having divergent meanings or relationship may have vector values that are not close in proximity.

In a first implementation, S220 may function to implement as a sentence embedding technique a universal sentence encoder (USE), such as a Deep Averaging Network method, which functions to average word embeddings and passes the resultant averages through a feedforward network or the like to generate a vector representation for each instance within a corpus of training data. Preferably, the USE may be trained using a range of supervised and unsupervised tasks.

In a second implementation, S220 may function to implement as a sentence embedding technique a smooth inverse frequency (SIF). Using the SIF technique, S220 may function to compute a weighted average of word embeddings for each instance within a corpus of training data. In this second implementation, the weighted average for each instance within a corpus of training data may be determined based on a word frequency within the entirety of the corpus of training data.

In a third implementation, S220 may function to implement as a sentence embedding technique a simple average of word embeddings. That is, S220 may function to compute an unweighted average of word embedding that preferably does not allow preferential weightings based on one or more characteristics of an instance and/or one or more characteristics of a corpus of training from which an instance may be selected.

It shall be noted that while the method 200 may function to implement S220 with any one of the above-identified word and/or sentence embedding techniques, the method 200 may function to apply any combination of the above when executing S220 or any suitable or known sentence embedding techniques.

2.3 Centroid

S230, which includes computing one or more statistical metrics of the corpus of raw machine learning training data, includes identifying statistical characteristics of the corpus of raw machine learning training data based on the vector representations (as identified in S220) for each instance within the corpus.

Figure 3:
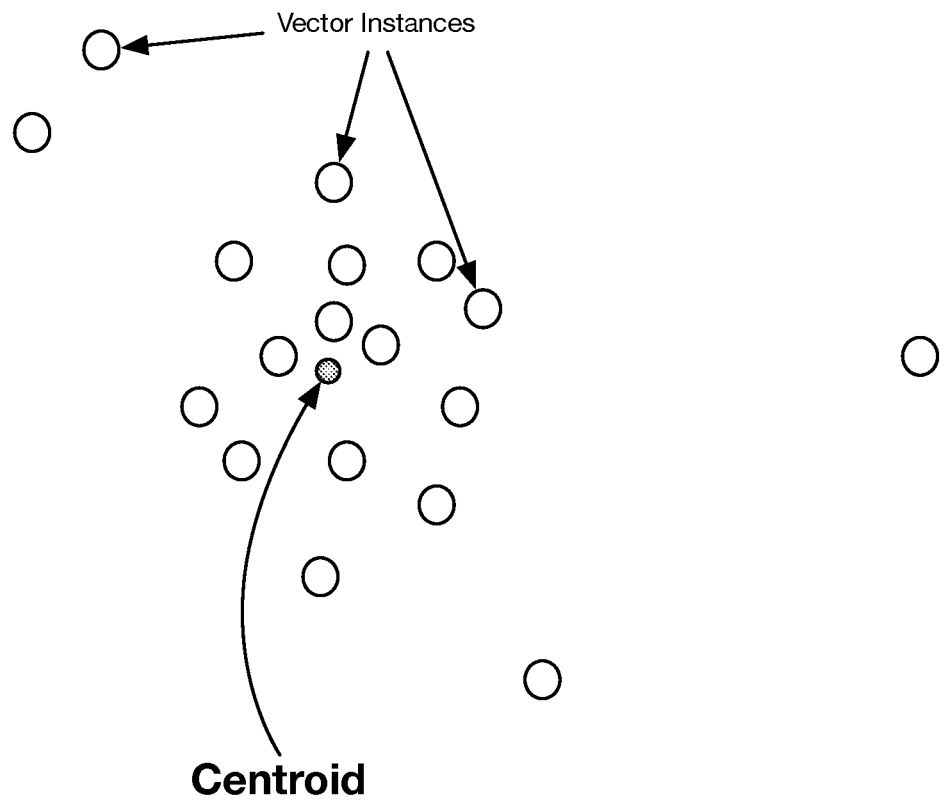
FIG. 3 illustrates a schematic representation of vectors of training data mapped in n-dimensional space having a centroid in accordance with one or more embodiments of the present application.

In a preferred embodiment, S230 may function to compute a mean or centroid for the corpus of raw machine learning training data, as shown by way of example in FIG. 3. Specifically, in such preferred embodiment, each vector representation for each training data instance within the corpus preferably includes a numerical value. Accordingly, S230 may function to aggregate the vector representations for all instances within the corpus and subsequently compute an average vector representation value for the corpus based on the aggregate of the vector representations.

Additionally, or alternatively, S230 may function to compute a distance value for each instance within the corpus of raw machine learning training data. Preferably, S230 may function to compute the distance value for each instance based on a difference between the vector representation for a given instance with the corpus and the mean vector representation value or the centroid representation value for the corpus. Accordingly, the computed distance value for each instance within the corpus preferably represents an amount of similarity or dissimilarity between a given instance and an average instance within a corpus of machine learning training data. For instance, the greater the distance value for a given instance within a corpus of training data may indicate that the given instance may be less similar to an average instance of the corpus, especially relative to another instance which may have a lower distance value than the distance value of the given instance. Conversely, the lower the distance value for a given instance within a corpus may indicate that the given instance of the corpus may be close in similarity and/or meaning to an average instance of the corpus. An exception may include anomalous or outlier instances that may have large distance values from a mean of a corpus but that generally share a common meaning or interpretation as an average instance.

2.35 Ranking

Optionally, S235, which includes enumerating each instance of the corpus of raw machine learning training data, may function to organize instances within the corpus based on the computed distance value (S230) for each instance in the corpus. That is, in a preferred embodiment, S235 may function to rank or otherwise, generate a listing of the instances of a corpus of training data in an order based on the distance value (from a centroid of the corpus) associated with each respective instance of the corpus.

In one embodiment, S235 may function to rank instances of a corpus based on their respective distance values in an ascending manner, such that the instances of a corpus having relatively smaller distance values than subsequently listed or ordered instances appear in a higher order (i.e., more highly ranked) than the instances with relatively larger distance values. In this way, the instances of a corpus which may have the greatest disparity or greatest distinct from an average or mean vector representation value may be listed or ordered towards and/or at the bottom of the ordering (or listing). Thus, with mere visual inspection of the bottom of the ordering, one may be able to glean one or more anomalous instances.

In some embodiments, S235 may function to rank instances of a corpus based on their respective distance values in a descending manner, such that the instances of a corpus having relatively larger distance values than subsequently listed or ordered instances appear in a higher order than the instances with relatively smaller distance values.

It shall be noted that S235 may function to organize, enumerate, or list the instances of a corpus in any suitable manner for purposes of distinguishing between instances of a corpus of training with relatively greater and relatively lesser distance values.

2.4 Outlier/Anomaly Detection

Figure 4:
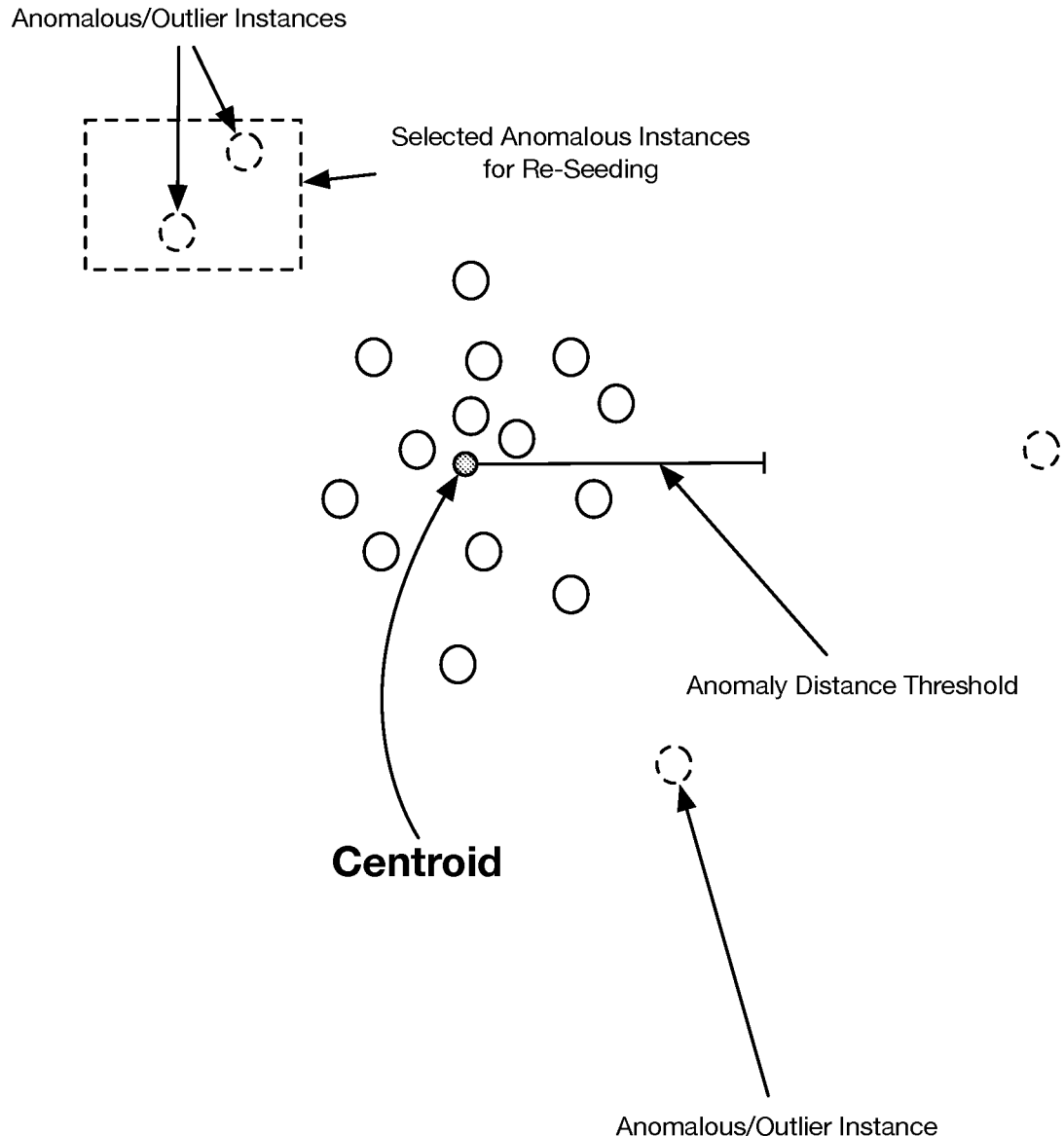
FIG. 4 illustrates a schematic representation of vectors of training data mapped in n-dimensional space having anomalous instances in accordance with one or more embodiments of the present application.

S240, which includes identifying one or more anomalous instances within the corpus of training data, may function to detect anomalous instances within the corpus based on one or more anomaly detection techniques. An anomalous instance as referred to herein may generally relate to an instance of training data identified within a corpus of training data having a vector representation (or any suitable sentence representation) that varies sufficiently (i.e., beyond a target threshold) from a mean vector representation or centroid representation of the corpus. In a preferred embodiment, an anomalous instance sufficiently varies from a mean vector representation if a characteristic or metric (e.g., distance value) associated with the instance satisfies or exceeds a dynamic anomaly threshold or conversely, a characteristic or metric associated with the instance does not satisfy a dynamic similarity threshold or the like, as shown by way of example in FIG. 4.

Accordingly, in a preferred embodiment, S240 may function to identify anomalous instances within a corpus based on evaluating distance values associated with instances in a corpus of training data to a dynamic (anomaly) threshold. In such preferred embodiment, the instances within a corpus may be enumerated or listed (as discussed in S235) in ascending order based on their respective distance values. The dynamic threshold may be set, such that instances with relatively larger distance values and being arranged or positioned towards a bottom of the list may fail to satisfy the dynamic threshold and therefore, may be identified as anomalous instances or outliers.

It shall be noted that the one or more dynamic (anomaly) thresholds may be set arbitrarily and/or based on user preferences.

In some embodiments, the one or more dynamic anomaly thresholds may be determined and/or dynamically set based on characteristics of the corpus of raw machine learning training data. For instance, S240 may function to dynamically set a dynamic anomaly threshold based on density characteristics of the corpus of raw machine learning training data. Specifically, in such embodiments, in a vector mapping of vector representations of instances within the corpus of training data, a cluster or a sufficient density (e.g., a density exceeding or satisfying a density threshold) of instances of corpus may be identified because of their proximity in value to some mean vector representation of the corpus and subsequently, a dynamic threshold may be set to a distance value that is some distance outside of the identified density or cluster of the corpus. In this way, those instances having distance values outside of the cluster may be identified as anomalous instances.

It shall be noted that any suitable technique or method may be used to set a dynamic threshold. Additionally, or alternatively, it shall be noted that predetermined thresholds may also be set. For instance, predetermined anomaly thresholds may be set based on historical distance values of anomalous instances in prior corpuses.

In a variant of S240, S240 may function to generate a graphical representation of all instances of a corpus. In some embodiments, the graphical representation may include a representation (e.g., a vector representation) of each of the instances of a corpus within an n-dimensional plane. In such variant, S240 may function to identify anomalous instances within a corpus of training as those instances that appear visually distant from one or more clusters or densities of other instances of the corpus. In such variant, a given instance of training data may appear visually distant if a point or the like of the vector representation of the given instance falls outside of a density or a cluster of other instances of training data within the corpus. Thus, a visually distance vector representation or instance relates to an instances that falls beyond a density or a cluster of other instances when illustrated via a graphical representation.

Accordingly, using any suitable anomaly detection technique, S240 may function to identify anomalous instances within a corpus of training data. Additionally, or alternatively, S240 may function to extract, as a sub-list or sub-population of instances of the corpus, any identified anomalous instance(s), which may be additionally evaluated and/or validated.

2.45 Anomalous Instance Validation

Optionally, or alternatively, S245, which includes validating or invalidating an anomalous instance, may function to evaluate any identified anomalous instance of a corpus and determine whether a (classification) label associated with the anomalous instance is valid or invalid. That is, S245 may function to determine whether the given instance or training sentence was properly associated with an appropriate (or subject) intent label or other classification label.

In one embodiment, S245 may function to identify as invalid instances one or more anomalous instances from a sub-list extracted from a corpus of training data that fail to overlap or do not share in a same or similar semantic meaning as an average training data sample from the corpus or a seed example that was used in deriving the training data within the corpus.

In such embodiment, S245 may function to disregard the label attributed to the invalid instance and further, may function to remove or discard the invalid instance from the entirety of the corpus of training data. In this way, the invalid instance may not be used for training data input for training a machine learning model that may be deployed in a live conversational/dialogue system.

In some embodiments, S245 may function to identify as valid instances (or unique instances) one or more anomalous instances from the corpus of training data that have overlapping semantic meanings or that share a similar semantic meaning as an average training data sample from the corpus or as a seed example that was used in building the training data within the corpus.

In such embodiments, when S245 validates the label associated with an anomalous instance, S245 may function to maintain these validated anomalous instances within the corpus of training data thereby allowing these validated anomalous instances to be used as training data for a machine learning model. Additionally, S245 may function to additionally move all or some of the validated anomalous instances into a grouping that may be used for re-seeding the training data sourcing mechanism, as described in more detail below in S250.

S2.5 Re-Seeding

S250, which includes identifying a grouping or subset of validated anomalous instances of the corpus of training and using the group of validated anomalous instances to source additional raw machine learning training data, may function to re-seed the training data sourcing system described in U.S. patent application No. 15/911,491, which is incorporated herein in its entirety by this reference. Re-seeding using validated anomalous instances may preferably function to enable a sourcing of raw training data samples that improve a diversity metric and/or coverage metric of the original corpus of raw machine learning training data. That is, the validated anomalous instances acting a seed training samples for sourcing machine learning training data may enable a sourcing, discovery and/or a generation of machine learning training samples that may be different in structure than the raw training data samples of the original corpus of raw machine learning training data but may have semantically similar interpretations and preferably, share or may be covered by a same or similar dialogue intent.

In a preferred embodiment, the resultant corpus of raw machine learning training data returned based on re-seeding the training data sourcing system with the group of validated anomalous instances may similarly be processed as described in S220-S245. S250 may function to continuously iterate through new corpora of raw machine learning training data until a stopping trigger or stopping threshold is satisfied. For instance, in some embodiments, S250 may be automatically discontinued based on one or more corpus characteristic metrics are met, such as a diversity threshold and/or a coverage threshold or the like.

Figure 5:
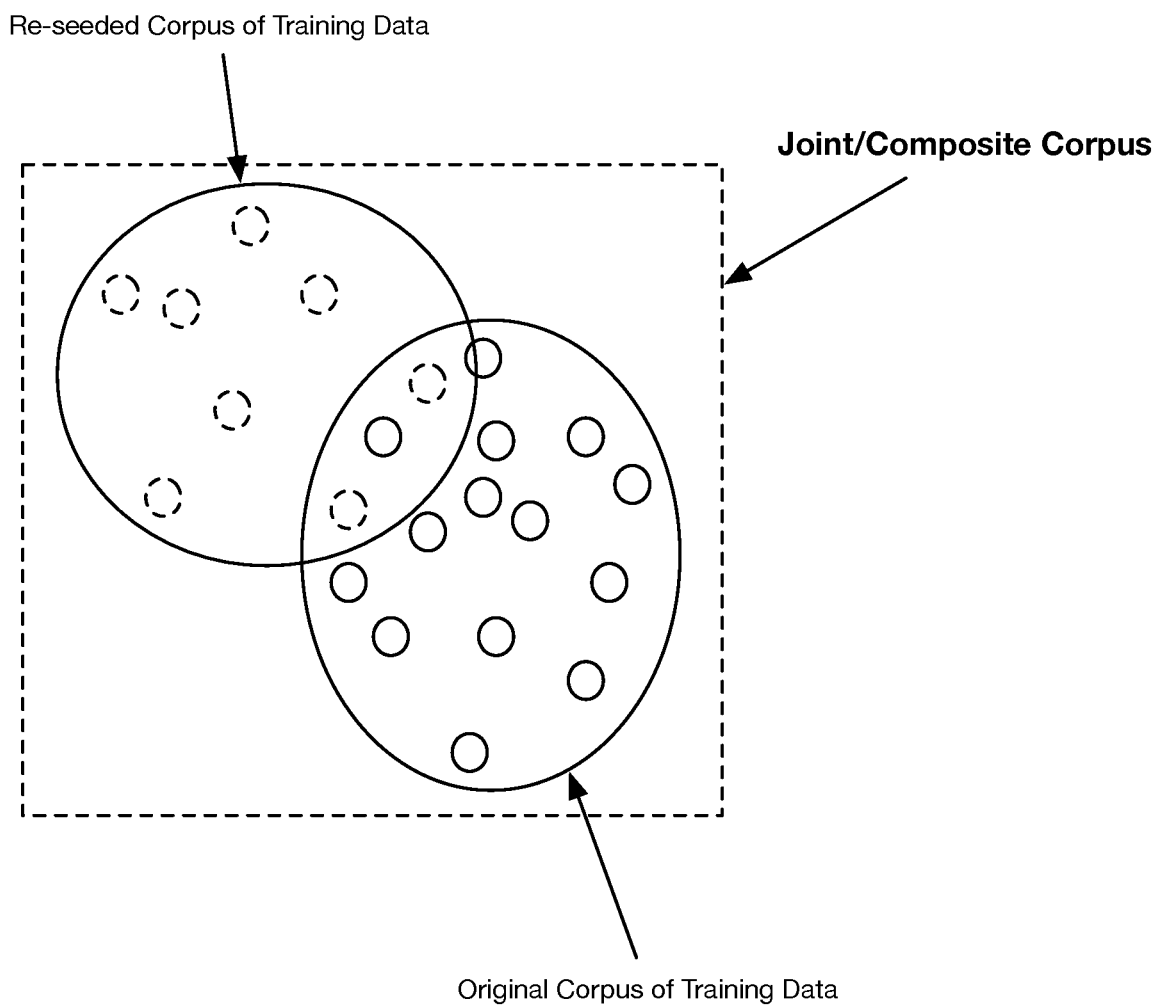
FIG. 5 illustrates a schematic representation of a joint corpus of training data in accordance with one or more embodiments of the present application.

In some embodiments, S250 may function to construct a joint corpus of raw machine learning training data that includes a first corpus (i.e., original corpus) of raw machine learning training data sourced based on seed samples and a second corpus of raw machine learning training data sourced based on re-seeded samples (i.e., anomalous instance seed samples) collected from the first corpus, as shown by way of example in FIG. 5. The joint corpus of raw machine learning training data preferably includes an expanded corpus of raw machine learning training data includes a number of instances of training data greater than the first corpus.

While in the above-noted embodiments and/or examples, a first corpus (e.g., an original corpus) and a second corpus (a re-seeded corpus) may be composed together to form a joint corpus or a composite corpus of raw machine learning data, it shall be known that S250 may function to join any number of distinct corpora that may include an original seeded corpus of raw training data and a plurality of distinct corpora of re-seeded corpora of training data. In such embodiments, S250 may function to continue to perform a joinder and/or a composition of a seeded corpus of training data together with one or more distinct re-seeded corpora of training data until one or more of a coverage metric threshold and/or a diversity metric threshold is satisfied or exceeded by the resultant joint corpus.

Accordingly, in some embodiments, once a diversity metric and/or coverage metric threshold is met for a combination of all the corpora that were generated according to S210-S250, the method 200 may function to deploy the corpus of training data for training a live production machine learning model or ensemble of machine learning models for a conversation and/or dialogue system. In a preferred embodiment, each distinct training instance within the joint corpus or the combination of the distinct corpora of training data may be associated with a single classification label for a specific dialogue intent such that a machine learning model trained using the joint corpus of training data may function to accurately predict and/or classify utterances having at least the specific dialogue intent.

While in several of the embodiments described herein, the method 200 may function to identify outliers and/or intelligently construct training data corpus based on the identified outliers for training and/or improving models that preferably perform dialogue intent classification, it shall be noted, however, that the outlier identification techniques and training data corpus formation techniques that are described may be used to intelligently train and improve any suitable model that may perform any type or kind of inferential/prediction tasks and any type or kind of classification tasks including, but not limited to, slot value classification/inference, utterance intent classification, dialogue predictions, and/or the like.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A system for identifying anomalous training data samples and intelligently forming a corpus of training data for improving a machine learning-based dialogue system, the system comprising:
 a machine learning-based automated dialogue service implementing by one or more hardware computing servers that:
  sources a corpus of raw machine learning training data from one or more sources of training data based on a seeding sample set that includes a plurality of seed training samples;
  generates a vector representation for each instance of training data in the corpus of raw machine learning training data;
  identifies statistical characteristics of the corpus of raw machine learning training data based on a mapping of the vector representation for each instance of training data within the corpus of raw machine learning training data;
  identifies a density of the plurality of distinct instances of training data based on the mapping of the vector representation for each distinct instance of training data within the corpus, wherein the density of the plurality of distinct instances relates to a cluster or a grouping of distinct instances of training data of the corpus of raw machine learning training data in which each distinct instance of training data is within a predetermined distance of another distinct instance of training data within the cluster or the grouping;
  sets an anomaly threshold based on identifying an absolute distance value away from a centroid of the density of the plurality of distinct instances, wherein a distal end of the absolute distance falls along an area beyond the density of the plurality of distinct instances;
  identifies, as anomalous instances, each of one or more instances of training data of the corpus of raw machine learning training data based on the identified statistical characteristics, wherein
   identifying the one or more anomalous instances includes:
    identifying a given distinct instance as one of the one or more anomalous instances if a distance value for the given distinct instance away from a centroid of the density satisfies or exceeds the anomaly threshold; and curates the corpus of raw machine learning training data based on each of the one or more instances of training data identified as anomalous instances.

2. The system according to claim 1, wherein the machine learning-based automated dialogue service further:

defines a re-seeding sample set that includes a plurality of re-seeding training samples, wherein each of the plurality of re-seeding training samples comprises a distinct one of the one or more anomalous instances;

sources a re-seeding corpus of raw machine learning training data from one or more sources of training data based on the re-seeding sample set comprising the plurality of re-seeding training samples based on the one or more anomalous instances; and constructs a joint corpus of training data that includes a synthesis of [i] the corpus of raw machine learning training data and [ii] the re-seeding corpus of raw machine learning training data.

3. A method for identifying anomalous training data samples and intelligently forming a corpus of training data for improving a machine learning-based dialogue system, the method comprising:

sourcing a corpus of raw machine learning training data from one or more sources of training data based on a plurality of seed training samples, wherein the corpus of raw machine learning training data comprises a plurality of distinct instances of training data;

generating a vector representation for each distinct instance of training data in the corpus of raw machine learning training data;

identifying statistical characteristics of the corpus of raw machine learning training data based on a mapping of the vector representation for each distinct instance of training data within the corpus of raw machine learning training data;

identifying a density of the plurality of distinct instances of training data based on the mapping of the vector representation for each distinct instance of training data within the corpus, wherein the density of the plurality of distinct instances relates to a cluster or a grouping of distinct instances of training data of the corpus of raw machine learning training data in which each distinct instance of training data is within a predetermined distance of another distinct instance of training data within the cluster or the grouping;

setting an anomaly threshold based on identifying an absolute distance value away from a centroid of the density of the plurality of distinct instances, wherein a distal end of the absolute distance falls along an area beyond the density of the plurality of distinct instances;

identifying one or more anomalous instances of the plurality of distinct instances of training data of the corpus of raw machine learning training data based on the identified statistical characteristics of the corpus, wherein identifying the one or more anomalous instances includes:

identifying a given distinct instance as one of the one or more anomalous instances if a distance value for the given distinct instance away from a centroid of the density satisfies or exceeds the anomaly threshold; and curating the corpus of raw machine learning training data based on each of the one or more instances of training data identified as anomalous instances.

4. The method according to claim 3, wherein the one or more anomalous instances relate to one or more instances of training data identified within the corpus of raw machine learning training data having vector representations that satisfies or exceeds a target threshold based on a mean vector representation of the corpus of raw machine learning training data.

5. The method according to claim 3, wherein the plurality of seed training samples comprise a plurality of example utterances and/or prompts for a specific dialogue intent of a machine learning-based automated dialogue system.

6. The method according to claim 3, further comprising:

defining a re-seeding sample set that includes a plurality of re-seeding training samples, wherein each of the plurality of re-seeding training samples comprises a distinct one of the one or more anomalous instances.

7. The method according to claim 6, further comprising:

sourcing a re-seeding corpus of raw machine learning training data from one or more sources of training data based on the re-seeding sample set comprising the plurality of re-seeding training samples based on the one or more anomalous instances.

8. The method according to claim 7, further comprising:

constructing a joint corpus of training data that includes a synthesis of [i] the corpus of raw machine learning training data and [ii] the re-seeding corpus of raw machine learning training data.

9. The method according to claim 7, further comprising:

calculating one or more efficacy metrics of the joint corpus of training data, wherein calculating the one or more efficacy metrics includes calculating one or more of a coverage metric value and a diversity metric value of the joint corpus of training data;

sourcing additional re-seeding corpora of raw machine learning training data until a coverage metric threshold and/or a diversity metric threshold of a resulting joint corpus of raw machine learning training data is satisfied by one or more of the coverage metric value and the diversity metric value, wherein the resulting joint corpus of raw machine learning training data combines each of the corpus of raw machine learning training data, the re-seeded corpus of raw machine learning training data, and all subsequent re-seeded corpus of raw machine learning training data.

10. The method according to claim 3, wherein:

each instance of training data of the corpus of raw machine learning training data comprises a word or a sentence for performing a training of a machine learning model of a machine learning-based automated dialogue system, generating the vector representation for each instance of training data includes:

computing a vector value for each instance of training data using one or more sentence embedding techniques or one or more word embedding techniques.

11. The method according to claim 3, wherein identifying the statistical characteristics of the corpus of raw machine learning training data includes:

computing a centroid of the corpus of raw machine learning training data based on the vector representation for each instance of training data within the corpus of raw machine learning training data.

12. The method according to claim 3, wherein identifying the statistical characteristics includes:

computing a distance value from a centroid of the corpus of raw machine learning training data for each instance of training data within the corpus of raw machine learning training data.

13. The method according to claim 12, further comprising:
enumerating each instance of training data of the corpus of raw machine learning training data in an ascending order or a descending order based on the computed distance value for each instance of training data.

14. The method according to claim 13, wherein
identifying one or more anomalous instances of the plurality of distinct instances of training data of the corpus of raw machine learning training data includes:
evaluating the computed distance value for each distinct instance of training data against an anomaly threshold.

15. The method according to claim 3, further comprising:
generating a graphical representation of the plurality of distinct instances of training data of the corpus of raw machine learning training data based on the vector representation for each distinct instance of training data, wherein identifying the one or more anomalous instances includes:
identifying a given instance as one of the one or more anomalous instances if the given instance is visually distant from a density or a cluster of distinct instances of training data within the corpus.

16. The method according to claim 3, further comprising:
evaluating each of the one or more anomalous instances of the corpus of raw machine learning training data, wherein the evaluating includes determining for each of the one or more anomalous instances whether a dialogue intent classification label associated with a respective one of the one or more anomalous instances matches an identified dialogue intent of the respective one of the one or more anomalous instances.

17. The method according to claim 3, further comprising:
identifying whether each respective one of the one or more anomalous instances comprises a valid anomalous instance or an invalid anomalous instance, wherein:
(i) a valid anomalous instance relates to an instance of training data that (a) overlaps or shares in a same or a similar semantic meaning as an average training data sample instance from the corpus of raw machine learning training data or (b) overlaps or shares in a same or a similar semantic meaning as a seed training sample of the seeding sample set, and
(ii) an invalid anomalous instance relates to an instance of training data that (a) fails to overlap or does not share in a same or a similar semantic meaning as an average training data sample instance from the corpus of raw machine learning training data or (b) fails to overlap or does not share in a same or a similar semantic meaning as a seed training sample of the seeding sample set.

18. The method according to claim 17, wherein
curating the corpus of raw machine learning training data includes:
if a distinct one of the one or more anomalous instances is identified as the invalid anomalous instance, reducing the corpus of raw machine learning training data by discarding the invalid anomalous instance.

19. The method according to claim 17, further comprising:
defining a re-seeding sample set that includes a plurality of valid anomalous instances; and
sourcing a re-seeding corpus of raw machine learning training data from one or more sources of training data based on the plurality of valid anomalous instances.

* * * * *